United States Patent Office

> 3,530,157
> Patented Sept. 22, 1970

3,530,157
ORGANOTIN MERCAPTOACID ESTERS
Samuel Hoch, Brooklyn, N.Y., assignor to Tenneco
Chemicals, Inc., a corporation of Delaware
No Drawing. Filed Oct. 5, 1967, Ser. No. 672,954
Int. Cl. C07f 7/22
U.S. Cl. 260—429.7                     4 Claims

ABSTRACT OF THE DISCLOSURE

Stable organotin mercaptoacid esters are prepared by condensing an organotin halide or oxide with an ester of a mercaptoacid in a reaction mixture that contains at least 60 percent of an inert organic solvent such as benzene, toluene, mineral spirits, methanol, and the like. Organotin compounds prepared in this way remain stable for many months, whereas those prepared in less dilute reaction mixtures undergo decomposition on storage for as little as one day. These organotin compounds find utility as stabilizers for vinyl halide resin compositions.

---

This invention relates to a process for the production of organotin derivatives of mercapto compounds. More particularly, it relates to a process for the production of stable organotin mercaptoacid esters.

Organotin mercaptoacid esters, which are condensation products of esters of mercaptoacids with organotin halides or oxides, are known to be excellent stabilizers for vinyl halide resin compositions. The preparation of these compounds and their use as stabilizers for vinyl halide resin compositions are described in detail in U.S. Pat. 2,641,588 (Leistner and Knoepke), U.S. Pat. 2,641,596 (Leistner and Hecker), and U.S. Pat. 2,648,650 (Weinberg and Johnson). The use of these compounds as stabilizers for vinyl halide resins has been limited to a large extent by their instability. On standing for as little as one day at room temperature, the organotin mercaptoacid esters prepared by the previously-known processes start to decompose to form crystalline thioglycolates and other compounds that are not useful as stabilizers for vinyl halide resin compositions. Various materials have been proposed as preservatives for the organotin mercaptoacid esters, but none has proven to be entirely satisfactory for this purpose. For example, Hecker in U.S. Pat. 2,789,963 disclosed that the addition of polyvalent metal salts of weak carboxylic acids, such as calcium 2-ethylhexoate or zinc naphthenate, to an organotin mercaptoacid ester will inhibit its decomposition on storage. Unfortunately, however, the addition of these salts has an adverse effect on the ability of the organotin mercaptoacid esters to stabilize vinyl halide resin compositions.

In accordance with this invention, it has been found that the stability of organotin mercaptoacid esters can be substantially increased by carrying out their preparation in reaction mixtures that contain at least 60 percent by weight of an inert organic solvent. An organotin mercaptoacid ester prepared in this way can usually be stored at room temperature for many months without the development of more than a small amount of a crystalline precipitate in it.

The organotin mercaptoacid esters that can be stabilized in accordance with the process of this invention include those disclosed in U.S. Pat. 2,641,588, U.S. Pat. 2,641,596, and U.S. Pat. 2,648,650. These compounds have the structural formula $$R_nSn X_{4-n}$$

wherein R represents an alkyl, oxyalky, aryl, oxyaryl, aralkyl, or cycloalkyl group. X represents an ester of a mercaptoacid having from 2 to 6 carbon atoms, whose sulfur atom is linked to the tin atom, and $n$ represents a number in the range of 1 to 3. Illustrative of these compounds are the following: monobutyltin tris-(cyclohexyl thioglycolate), dibutyltin bis-(hexyl thiopropionate), dioctyltin bis-(benzyl thiobutyrate), dicyclohexyl bis-(isooctyl thiobutyrate), triphenyltin butyl thiovalerate, diphenyltin bis-(phenyl thiocaproate), and the like. A preferred group of these organotin compounds have the structural formula $$R°_nSn(SCH_2COOR')_{4-n}$$

wherein R° represents an alkyl group having from 4 to 8 carbon atoms, R' represents an alkyl, aryl, aralkyl, alkaryl, or cycloalkyl group, and $n$ represents a number in the range of 1 to 3. These include dibutyltin bis-(butyl thioglycolate), trihexyltin isooctyl thioglycolate, octayltin tris-(benzyl thioglycolate), dioctyl tin bis-(tolyl thioglycolate), dibutyltin bis-(cyclohexyl thioglycolate), and the like. The process of this invention is of particular value in the preparation of dibutyltin bis-(isooctyl thioglycolate).

The reaction by which dibutyltin bis-(isooctyl thioglycolate) is prepared may be represented by the following equation:

$$(C_4H_9)_2SnO + 2(HSCH_2COOC_8H_{17}) \rightarrow (C_4H_9)_2Sn(SCH_2COOC_8H_{17})_2 + H_2O$$

In the practice of this invention, stable organotin mercaptoacid esters are prepared by condensing organotin halides or oxides with esters of mercaptoacids at elevated temperatures in the presence of a substantial amount of an inert organic soluvent. If a product that will remain stable on storage for at least several months is to be obtained, the reaction mixture in which it is prepared must contain aproximately 60 percent or more by weight of an inert organic solvent. When less than this amount of solvent is used, the product does not have the required stability. It is generally uneconomical to prepare the organotin compounds in a reaction mixture that contains more than about 90 percent of an organic solvent.

Among the inert organic solvents that may be used as the medium for this condensation reaction are aliphatic and aromatic hydrocarbons, alcohols, ethers, esters, ketones, and the like, for example, benzene, toluene, xylene, hexane, mineral spirits, naphtha, methanol, ethanol, acetone, methyl isobutyl ketone, methyl acetate, and Cellosolve.

The condensation reaction is ordinarily carried out by heating the reaction mixture which comprises a mercaptoacid ester, organotin oxide or chloride, and organic solvent at a temperature between approximately 50° C. and the reflux temperature of the mixture and removing by azeotropic distillation the water produced by the condensation reaction. When the reaction has been completed, the solvent may be separated from the product by any suitable means. This may be accomplished, for example, by vaporizing the solvent at elevated temperatures under vacuum. The organotin mercaptoacid ester may then be used without further purification as a stabilizer for vinyl halide resin compositions.

The invention is further illustrated by the examples that follow. In these examples, all parts are parts by weight.

EXAMPLE 1

A mixture of 575 parts (2.79 moles) of isooctyl thioglycolate, 347.2 parts (1.395 moles) of dibutyltin oxide, and 1350 parts of benzene was heated at its reflux temperature (80° C.–85° C.) until 24.5 parts of water had been removed from it by azeotropic distillation. The reaction mixture, which contained 60 percent by weight of benzene, was then heated to 85° C./30–43 mm. to remove the solvent. The product was cooled and filtered. The dibutyltin bis-(isooctyl thioglycolate) obtained was a clear, water-white liquid that after 4 months' storage at room temperature contained a very small amount of crystalline white precipitate.

COMPARATIVE EXAMPLE A

A mixture of 639 parts (3.10 moles) of isooctyl thioglycolate, 386 parts (1.55 moles) of dibutyltin oxide, and 1220 parts of benzene was heated at its reflux temperature (80° C.–85° C.) until 27.0 parts of water had been removed from it by azeotropic distillation. The reaction mixture, which contained 55 percent by weight of benzene, was heated to 85° C./30–43 mm. to remove the solvent. The product was cooled and filtered. The dibutyltin bis-(isooctyl thioglycolate) obtained was a clear, water-white liquid that after two weeks' storage at room temperature contained a large amount of a crystalline white precipitate.

COMPARATIVE EXAMPLE B

A mixture of 2564 parts of isooctyl thioglycolate, 1548 parts of dibutyltin oxide, and 1560 parts of benzene was heated at its reflux temperature (90° C.–95° C.) until 109 parts of water had been collected by azeotropic distillation. The reaction mixture, which contained 28 percent by weight of benzene, was then heated to 90° C./37–58 mm. to remove the solvent. The product was cooled and filtered. The dibutyltin bis-(isooctyl thioglycolate) obtained was a clear, water-white liquid. After three days' storage at room temperature, this product contained a large amount of a crystalline white precipitate.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A stabilizer composition for vinyl halide resins that comprises a stabilized organotin mercaptoacid ester having the structure $$R_mS_nX_{4-n}$$

wherein R represents an alkyl group having from 4 to 8 carbon atoms, X represents an ester of a mecraptoacid having from 2 to 6 carbon atoms, whose sulfur atom is linked to the tin atom, and $n$ represents a number in the range of 1 to 3, said stabilized organotin mercaptoacid ester being the product obtained by the condensation of an ester of a mercaptoacid with an organotin halide or oxide in a reaction mixture that contains at least 60 percent by weight of an inert organic solvent.

2. The stabilizer composition of claim 1 wherein the reaction mixture in which the stabilized organotin mercaptoacid ester is prepared contains 60 percent to 90 percent by weight of an inert organic solvent.

3. The stabilizer composition of claim 1 wherein the reaction mixture in which the stabilized organotin mercaptoacid ester is prepared contains 60 percent to 90 percent by weight of benzene.

4. The stabilizer composition of claim 1 that comprises stabilized dibutyltin bis-(isooctyl thioglycolate).

References Cited

UNITED STATES PATENTS

| | | | |
|---|---|---|---|
| 2,832,751 | 4/1958 | Weinberg et al. | 260—429.7 X |
| 2,832,750 | 4/1958 | Weinberg et al. | 260—429.7 X |
| 2,789,102 | 4/1957 | Weinberg | 260—429.7 X |
| 2,789,963 | 4/1957 | Hecker | 260—429.7 X |
| 2,634,281 | 4/1953 | Mack et al. | 260—429.7 X |
| 2,648,650 | 8/1953 | Weinberg et al. | 260—429.7 X |
| 2,641,588 | 6/1953 | Leistner et al. | 260—45.75 |
| 2,641,596 | 6/1953 | Leistner et al. | 260—429.7 X |

HELEN M. McCARTHY, Primary Examiner

W. F. W. BELLAMY, Assistant Examiner

U.S. Cl. X.R.

260—45.75